(12) United States Patent
Freeman et al.

(10) Patent No.: US 10,838,760 B2
(45) Date of Patent: Nov. 17, 2020

(54) SYSTEMS AND METHODS FOR INTERRUPT DISTRIBUTION

(71) Applicant: NXP USA, Inc., Austin, TX (US)

(72) Inventors: Jeffrey Freeman, Austin, TX (US); Jehoda Refaeli, Austin, TX (US)

(73) Assignee: NXP USA, Inc., Austin, TX (US)

( * ) Notice: Subject to any disclaimer, the term of this patent is extended or adjusted under 35 U.S.C. 154(b) by 246 days.

(21) Appl. No.: 15/826,250

(22) Filed: Nov. 29, 2017

(65) Prior Publication Data

US 2019/0163519 A1    May 30, 2019

(51) Int. Cl.
   *G06F 9/48*    (2006.01)
(52) U.S. Cl.
   CPC .......... *G06F 9/4818* (2013.01); *G06F 9/4881* (2013.01)
(58) Field of Classification Search
   CPC .......................... G06F 9/4881; G06F 9/4818
   See application file for complete search history.

(56) References Cited

U.S. PATENT DOCUMENTS

| | | | | |
|---|---|---|---|---|
| 4,967,342 A | * | 10/1990 | Lent | G06F 9/4843 710/268 |
| 6,148,361 A | * | 11/2000 | Carpenter | G06F 9/4812 710/260 |
| 7,899,966 B2 | | 3/2011 | Kulkarni | |
| 2004/0158664 A1 | * | 8/2004 | Zilavy | G06F 9/4818 710/269 |
| 2005/0193157 A1 | * | 9/2005 | Kwon | G06F 13/24 710/260 |
| 2006/0190945 A1 | * | 8/2006 | Kissell | G06F 9/3851 718/108 |
| 2011/0040913 A1 | * | 2/2011 | Chung | G06F 13/4022 710/264 |
| 2014/0047150 A1 | | 2/2014 | Marietta et al. | |
| 2014/0108691 A1 | | 4/2014 | Kennedy et al. | |
| 2016/0196141 A1 | * | 7/2016 | Deshpande | G06F 13/24 712/244 |

* cited by examiner

*Primary Examiner* — Lewis A Bullock, Jr.
*Assistant Examiner* — Kevin X Lu
(74) *Attorney, Agent, or Firm* — Mary Jo Bertani

(57) ABSTRACT

A data processing system configured to execute a plurality of threads includes a plurality of domains and a plurality of domain interrupt controller circuits, each domain interrupt controller corresponding to a domain of the plurality of domains. Each domain interrupt controller includes an interrupt selection circuit configured to select an interrupt request from a set of interrupt requests received by the interrupt selection circuit and determine an interrupt vector for the selected interrupt request, a programmable domain-thread storage circuit configured to store an enable indicator corresponding to each thread of the plurality of threads in which the enable indicator for each corresponding thread indicates whether or not the corresponding domain is permitted to route interrupt vectors to the corresponding thread, and a routing circuit configured to route the interrupt vector to a selected thread of the plurality of threads which is selected based at least in part on the enable indicators.

20 Claims, 3 Drawing Sheets

SYSTEMS AND METHODS FOR INTERRUPT DISTRIBUTION

BACKGROUND

Field

This disclosure relates generally to semiconductor processing systems, and more specifically, to distributing interrupts in multi-core or multi-thread microprocessor systems.

Related Art

Real-time operating systems require very short interrupt service times from request to completion. In a device, the number of interrupt sources could be very large compared to the number of cores and threads that are implemented. In single core devices, an interrupt priority tree can be implemented for that core to select the highest priority interrupt source (IRQ) to be serviced. With an increase of integrated cores within a single device, a priority tree was associated with each core. When thread architecture was introduced, the number of priority trees scaled by the number of cores times the number of threads per device. Such an implementation had two major disadvantages. First, the architecture is not scalable and would cause a significant increase in power and area to implement the required uniform interrupt routing from all sources to all the cores and thread. Second, the software had to pre-select the interrupt sources for the cores and threads without any knowledge of the real-time load on the core while the application is running that would potentially impact interrupt service latency.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Systems and methods for automatic interrupt distribution in a multi-core and/or multi-threaded processor system are disclosed. Each interrupt is assigned to a domain. In addition, one or more threads are assigned to a given domain. Interrupt requests go to a domain priority tree. Each interrupt request is routed to a thread[m] based on a programmable domain thread register (DTR) made up of thread[m] select bits. Each domain priority tree calculates the highest priority interrupt request for that domain. The outputs of the domain priority tree (vector_out[m] and priority_out[m]) are the highest priority interrupt request queue associated with each thread. When more than one thread is assigned to a given domain, a round-robin algorithm routes the interrupt request to one of the threads associated with the domain as the threads are or become available. The routing logic can be implemented in hardware and reduces the need to have a one-to-one correspondence between domain and thread, thus reducing the overall system costs. Further, the routing hardware automatically balances the load of the interrupt requests between peripherals and threads.

Figure 1:
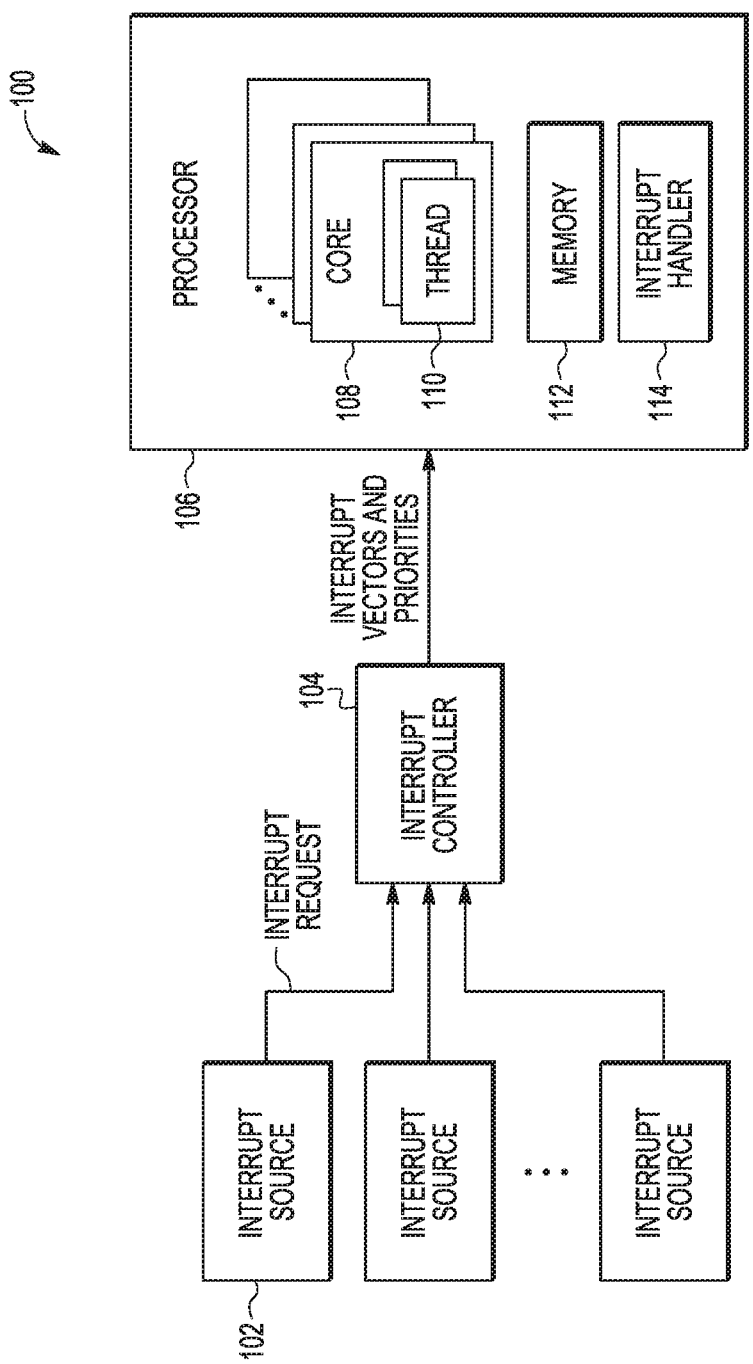
FIG. 1 is a block diagram of an embodiment of a multi-core, multi-thread microprocessor system in which an interrupt controller is used.

FIG. 1 is a block diagram of an embodiment of a multi-core, multi-thread microprocessor system 100 in which an interrupt controller 104 can be used to manage interrupt requests from various different internal and external interrupt sources 102, such as timers, serial input/output, analog to digital converters, keypad and switch inputs, and changes in logic levels on pins, among others. An interrupt is a communication process in which an internal or external device issues an interrupt request to a processor device 106. Processor device 106 checks for interrupt requests, and if an interrupt request is present, resets the interrupt, saves the return address, redirects to the memory location associated with the interrupt, handles the interrupt request, and then returns to processing at the return address.

Microprocessor system 100 includes one or more processor devices 106 that each include one or more processing cores 108 each capable of executing program instructions of one or more threads 110, one or more memory devices 112 (e.g., random access memory (RAM), cache), and interrupt handler 114. Processor device 102 can include other components that are not shown, such as input/output handlers, a memory management unit, communication busses, and bus interface units (BIU), among others. Processing cores 108 can access instruction data and operand data memory device 112, I/O handlers, or other sources. Data resulting from the execution of the instructions can be stored in memory device 112 or provided to an I/O device. Interrupt handler 114 includes interrupt service routines (ISRs) that attend to the interrupt requests by clearing interrupt flags and save register contents that may be affected by execution of the ISR. Interrupt controller 104 sends an interrupt vector that includes a pointer to a routine that will handle the interrupt in interrupt handler 114.

Figure 2:
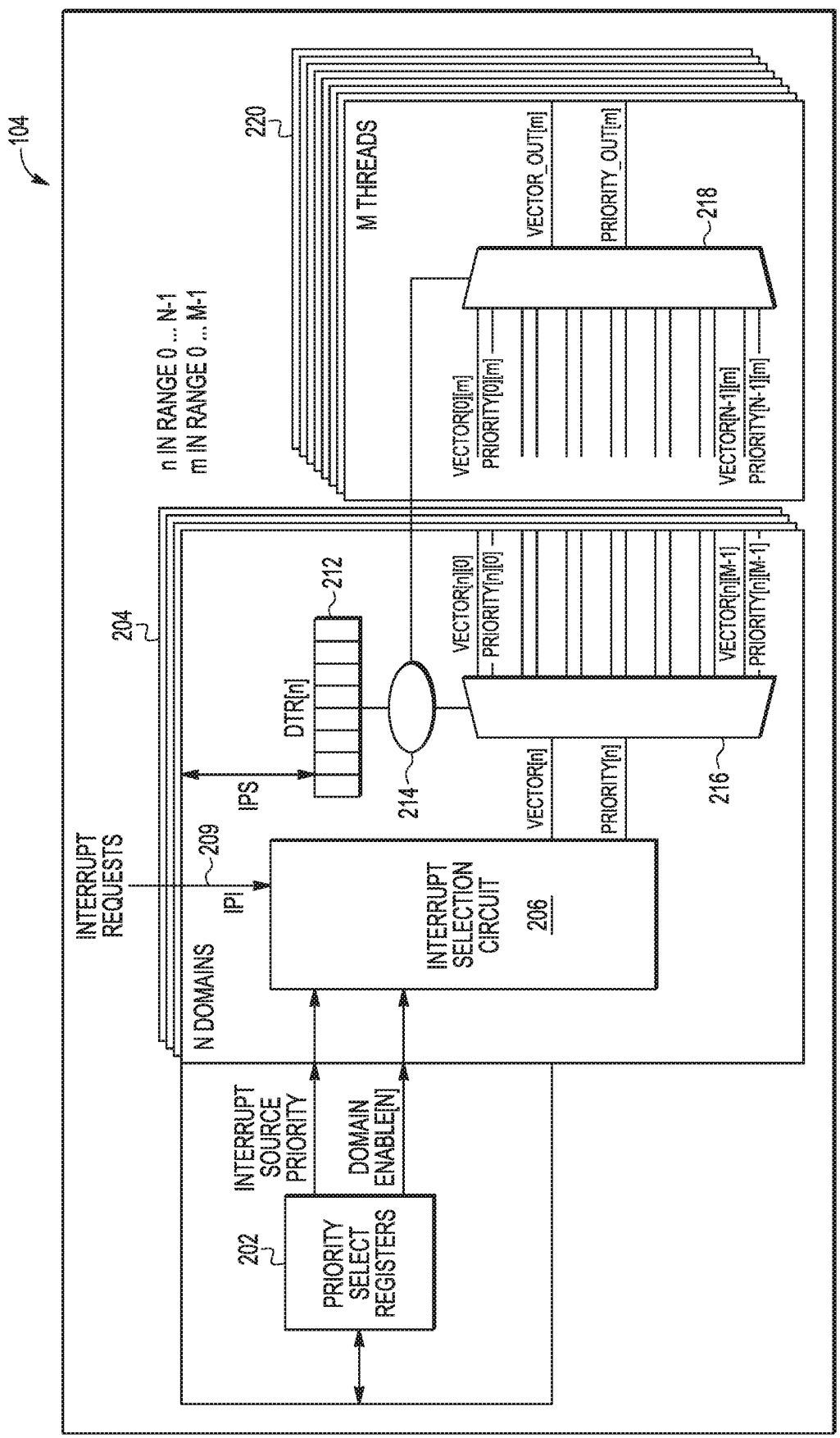
FIG. 2 is a block diagram of an embodiment of an interrupt controller that can be used in the multi-core, multi-thread microprocessor system of FIG. 1.

Referring to FIGS. 1 and 2, FIG. 2 is a block diagram of interrupt controller 104 for multi-core, multi-thread microprocessor system 100 of FIG. 1 in accordance with selected embodiments of the invention. In the example shown, interrupt controller 104 includes priority select registers 202, one or more domain interrupt controller circuits 204, and thread routing circuit 220 for one or more threads 110 being executed by one or more processing cores 108. Domain interrupt controller circuit 204 includes interrupt selection circuit 206, programmable domain-thread storage circuit 212, thread select circuit 214, and interrupt vector and priority selection circuit 216. Interrupt controller 104 further includes thread routing circuit 220 with a multiplexer 218. Together, programmable domain-thread storage circuit 212, thread select circuit 214, interrupt vector and priority selection circuit 216, and thread routing circuit 220 are referred to as a "router" herein. In the example shown, there are N domains and M threads, with N being a value less than M. Each domain has a corresponding domain interrupt controller circuit 204, and each thread has a corresponding thread routing circuit 220.

Priority select registers (PSRs) 202 are coupled for bi-directional access with interrupt sources 102 via a register access bus. Information regarding the priority, type, source, and which interrupts can be handled by threads 110 ad interrupt handlers 114 associated with each domain interrupt controller circuit 204 can be provided via a programming interface to PSRs 202 or other suitable mechanism, for example, from interrupt sources 102 directly. Other suitable information and attributes of the interrupts can be included in PSRs 202. PSRs 202 provide domain enable indicators (ENABLE(N)) and interrupt source priority to each domain interrupt controller circuit 204. The domain enable indicators can be implemented as bits in a word, with each bit representing an interrupt source. Each domain can be associated with a word of domain enable indicators, with the bits being set to indicate whether or not a particular domain can handle a particular interrupt. Interrupts can be set up as high priority or low priority, or other suitable priority level. The priority indicators can be implemented as bits in one or more words, with one or more of the bits representing whether the priority of an interrupt source is low, high, or something in-between.

Information for PSRs 202 such as priority and domain enable indicators can be programmed/initialized via register access bus 201 when system 100 is configured, and replaced or updated periodically, depending on interrupt sources 102 connected to interrupt controller 104. The PSR information can be stored in non-volatile memory accessible by system 100 during power-up initialization. Alternatively, PSRs 202 may include non-volatile memory configured to store the interrupt information indefinitely.

Data processing system 100 can include a resource domain controller (not shown) with information that groups various resources, such as bus masters and peripherals, into common domains. Each group of resources can be referred to as a domain interrupt controller circuit 204 that include threads 110 executing on processing cores 108 and one or more peripheral devices (shown as interrupt sources 102) that issue interrupt requests. Instead of statically assigning threads 110 to interrupt sources 102, interrupt controller 104 dynamically assigns interrupt requests to available threads 110 based on domain interrupt controller circuits 204 that are enabled to handle a particular type of interrupt and interrupt priority, as further described below.

The interrupt source priority and enable information from PSRs 202 is provided to interrupt selection circuit 206 from priority select registers 202. Interrupt selection circuit 206 also receives interrupt requests from interrupt sources 102. Information regarding an interrupt vector associated with each interrupt request can be programmed in interrupt selection circuit 206 or provided to interrupt selection circuit 206 by other suitable means. An interrupt vector is a location in interrupt handler 114 to which processing will be directed when an interrupt request is received. The location specified by an interrupt vector may depend on the type of interrupt, the priority of the interrupt, and/or other suitable criteria. The interrupt vector and corresponding interrupt priority is provided as input to interrupt vector and priority selection circuit 216 from interrupt selection circuit 206 for each domain interrupt controller circuit 204.

Domain-thread storage circuit 212 can store information regarding which thread 110 can receive which interrupt, and can be programmed via register access bus 211 or other suitable method. Information regarding which threads are configured to handle which interrupt requests can be programmed in domain-thread storage circuit 212 via register access bus 211 or provided to domain-thread storage circuit 212 by other suitable means. Thread select circuit 214 is configured to receive information regarding which thread can receive which interrupt from domain-thread storage circuit 212 and to provide which thread is enabled for each interrupt in a particular domain to interrupt vector and priority selection circuit 216. Thread select circuit 214 also provides a thread select signal to multiplexer 218 to allocate a corresponding interrupt vector and interrupt priority to each thread routing circuit 220.

Interrupt vector and priority selection circuit 216 receives interrupt vector and priority information for corresponding domains from interrupt selection circuit 206. Thread select circuit 214 selects the next available thread to handle a received interrupt request based on the enabled thread information from domain-thread storage circuit 212. The selected thread information for each interrupt is provided to interrupt vector and priority selection circuit 216 from thread select circuit 214. Interrupt vector and priority selection circuit 216 provides interrupt vectors and a corresponding priority indicator for each interrupt vector to multiplexer 218 for each domain 204 to each thread routing circuit 210. Typically, the interrupt with the highest priority is selected for an available thread that is capable of handling the particular type of interrupt, however, other selection criteria can be used. Thread routing circuit 210 can include a connection such as a bus between a domain (n) and each thread (m), to provide interrupt vectors and priorities from each domain (e.g. vector [n][0:M−1] and priority [n][0:M−1]) to available threads 110 (e.g., vector [0:N−1][m] and priority [0:N−1][m]) via multiplexer 218.

Interrupt controller 104 provides load balancing for servicing interrupts, allowing interrupts to be serviced by any available thread 110 associated with each domain interrupt controller circuit 204. Interrupts are programmed to each domain interrupt controller circuit 204, and each domain interrupt controller circuit 204 outputs the highest priority interrupt. An interrupt can be associated with more than one domain interrupt controller circuit 204, and one or more threads 110 can be associated with each domain interrupt controller circuit 204. Domain-thread storage circuit 212 indicates which threads 110 can receive an interrupt for the particular domain interrupt controller circuit 204. Thread select circuit 214 synchronizes allocation of interrupts in domain interrupt controller circuits 204 with threads 110 that are available to handle the interrupts. Multiplexer 218 provides an interrupt vector and interrupt priority to a corresponding thread 110 based on a control signal from thread select circuit 214.

Figure 3:
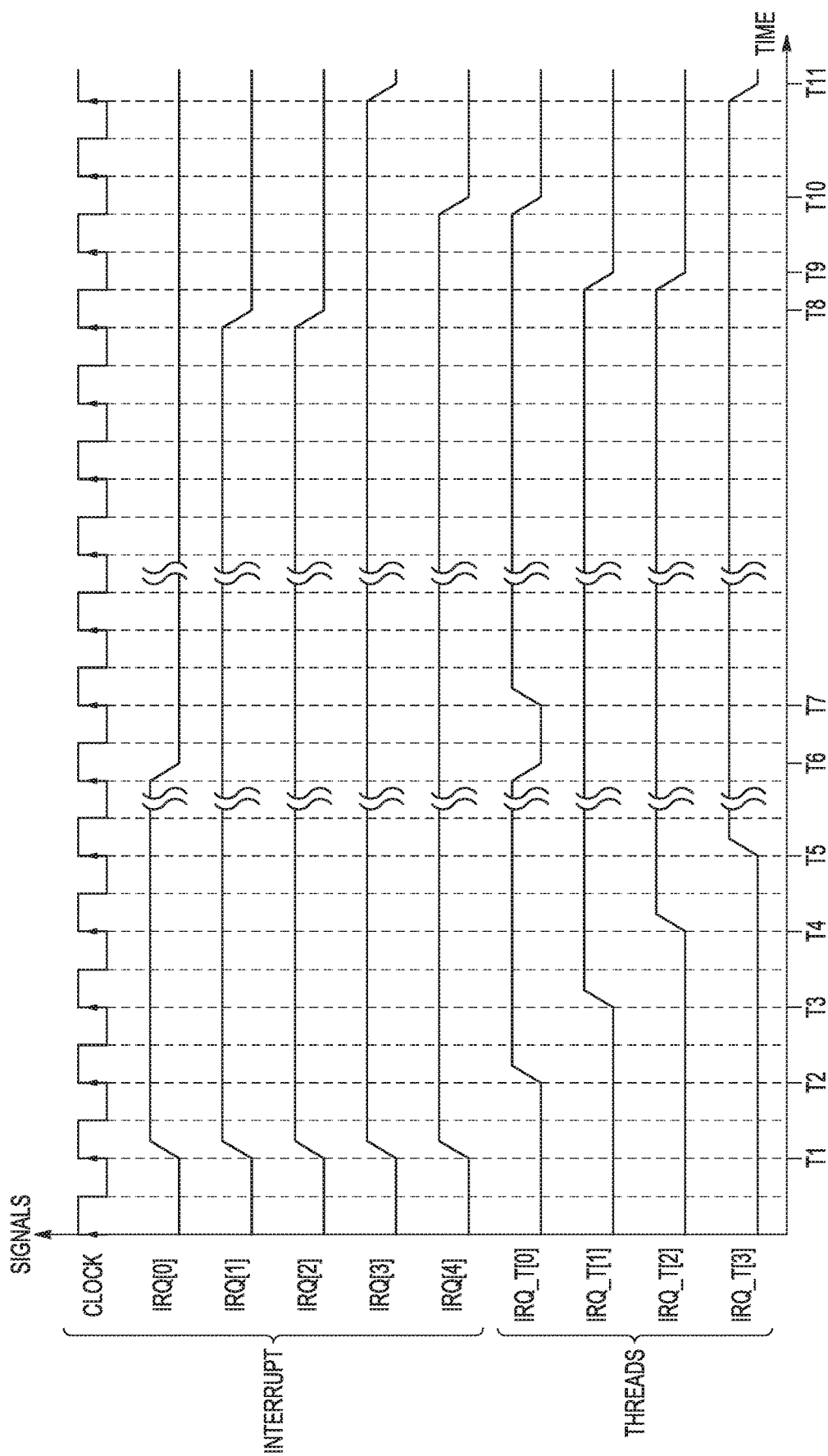
FIG. 3 is a timing diagram of an example of thread distribution in the interrupt controller of FIG. 2.

Referring to FIGS. 1 and 3, FIG. 3 is a timing diagram of an example of interrupt distribution of five interrupt requests routed to four threads 110 in the microprocessor system of FIG. 1. At time T1, five interrupt requests (IRQ[0:4]) are received by interrupt controller 104. First interrupt request IRQ[0] is assigned to first thread IRQ-T[0] at time T2, second interrupt request IRQ[1] is assigned to second thread IRQ-T[1] at time T3, third interrupt request IRQ[2] is assigned to third thread IRQ-T[2] at time T4, and fourth interrupt request IRQ[3] is assigned to fourth thread IRQ-T[0] at time T5. The remaining fifth interrupt request IRQ[4] is suspended until one of threads IRQ-T[0:3] becomes available.

At time T6, first thread IRQ-T[0] finishes processing first interrupt request IRQ[0]. After the next clock cycle at time T7, first thread IRQ-T[0] begins processing fifth interrupt IRQ[4]. At time T8, second and third threads IRQ-T[1:2] finish processing respective second and third interrupt requests IRQ[1:2]. At time T9, second and third threads IRQ-T[1:2] become available to process subsequent interrupt requests (not shown). At time T10, first thread IRQ-T[0] finishes processing fifth interrupt request IRQ[4]. At time T11, fourth thread IRQ-T[3] finishes processing fourth interrupt request IRQ[3] and is also now available to process a subsequent interrupt request. Note that although there were not enough threads available to process all of the interrupts request simultaneously, the remaining fifth interrupt request was serviced one clock cycle after the first thread finished processing the first interrupt request. Any available thread associated with a particular domain and capable of handling a particular interrupt request can be assigned to service the interrupt request, thereby reducing the amount of time that may otherwise be required to wait if the fifth interrupt request had been statically assigned to another thread that did not become available as soon as the first thread.

By now it should be appreciated that there has been provided, in some embodiments, a data processing system configured to execute a plurality of threads (M threads) can comprise a plurality of domains (N domains), wherein the data processing system is configured to execute a plurality of software codes each having data portions that are isolated in a domain of the plurality of domains and a plurality of domain interrupt controller circuits (204). Each domain interrupt controller circuit can correspond to a corresponding domain of the plurality of domains. Each domain interrupt controller circuit can comprise an interrupt selection circuit (206) configured to select an interrupt request from a set of interrupt requests received by the interrupt selection circuit and determine an interrupt vector for the selected interrupt request, and a programmable domain-thread storage circuit (212) configured to store an enable indicator corresponding to each thread of the plurality of threads. The enable indicator for each corresponding thread can indicate whether or not the corresponding domain is permitted to route interrupt vectors to the corresponding thread. A routing circuit (214 and 216) can be configured to route the interrupt vector to a selected thread of the plurality of threads which is selected based at least in part on the enable indicators.

In another aspect, the set of interrupt requests can be provided by a plurality of interrupt sources.

In another aspect, the data processing system can further comprise the plurality of interrupt sources.

In another aspect, the data processing system can further comprise priority status storage circuit configured to store a priority level of each interrupt source (PRI) and configured to store, for each domain of the plurality of domains, an enable bit per interrupt source (enable[N]).

In another aspect, in each domain interrupt controller circuit, the interrupt selection circuit can be configured to select an interrupt request based on the priority level of each interrupt source and the enable bit per interrupt source for the corresponding domain.

In another aspect, the data processing system can further comprise a plurality of processor cores (108), in which each processor core is configured to execute one or more threads of the plurality of threads.

In another aspect, the data processing system can further comprise a processor core configured to execute the plurality of threads.

In another aspect, the enable indicators of the programmable storage circuit in each domain interrupt controller circuit can be configured to be dynamically updated during operation of the data processing system.

In another aspect, the routing circuit of each domain interrupt controller circuit can comprise a connection (216 and 218) between the corresponding domain (n) and each thread (m) of the plurality of threads (e.g. (vector[n][0 to M–1]).

In another aspect, the routing circuit of each domain interrupt controller circuit can receive status information from each thread of the plurality of threads in which the selected thread is based on the enable indicators and the received status information from each thread.

In other embodiments, a method in a data processing system having a plurality of domains and configured to execute a plurality of threads wherein the data processing system is configured to execute a plurality of software codes each having data portions that are isolated in a domain of the plurality of domains, can comprise programming a domain-thread storage circuit corresponding to each domain of the plurality of domains with an enable indicator corresponding to each thread of the plurality of threads. The enable indicators of the domain-thread storage circuit of each corresponding domain can indicate a set of threads of the plurality of threads to which interrupt vectors are permitted to be routed from the corresponding domain. In one domain of the plurality of domains, a first interrupt request from a set of received interrupt requests can be selected. A first interrupt vector for the selected first interrupt request can be determined. Based on the enable indicators corresponding to the one domain, a first thread to receive the selected interrupt request can be selected. The first interrupt vector can be routed to the selected thread.

In another aspect, the method can further comprise, in the one domain, selecting a second interrupt request from the set of received interrupt requests, and determining a second interrupt vector for the selected second interrupt request. Based on the enable indicator corresponding to the one domain, a second thread to receive the selected second interrupt request can be selected. The second interrupt vector can be routed to the second selected thread.

In another aspect, the set of received interrupt requests can be received from a plurality of interrupt sources, and selecting the first interrupt request can be performed based on a priority level of each interrupt source and an enable bit per interrupt source for the one domain.

In another aspect, the method can further comprise programming the domain-thread storage circuit corresponding to the one domain with a different set of enable indicators such that the one domain can be permitted to route interrupt vectors to a different set of threads of the plurality of threads.

In another aspect, the data processing system can include a plurality of cores each configured to execute a set of threads of the plurality of threads.

In another aspect, the method can further comprise receiving status information from each thread of the plurality of threads, wherein the selecting the first thread can be selected based on the enable indicator corresponding to the one domain and the received status information from each thread.

In further embodiments, a data processing system configured to execute a plurality of threads (M threads) can comprise a plurality of domains (N domains). The data processing system can be configured to execute a plurality of software codes each having data portions that are isolated in a domain of the plurality of domains. A plurality of processor cores can each be configured to execute a set of threads of the plurality of threads. A plurality of domain interrupt controller circuits (204) can each correspond to a corresponding domain of the plurality of domains. Each domain interrupt controller circuit can comprise an interrupt selection circuit (206) configured to select an interrupt request from a set of interrupt requests received by the interrupt selection circuit and determine an interrupt vector for the selected interrupt request. A programmable domain-thread storage circuit (212) can be configured to store an enable indicator corresponding to each thread of the plurality of threads. The enable indicator for each corresponding thread can indicate whether or not the corresponding domain is permitted to route interrupt vectors to the corresponding thread. A routing circuit (214 and 216) can be configured to route the interrupt vector to a selected thread of the plurality of threads which is selected based at least in part on the enable indicators. The routing circuit can include a connection (216 and 218) between the corresponding domain (n) and each thread (m) of the plurality of threads (e.g. (vector [n][0 to M−1]).

In another aspect, the data processing system can further comprise a plurality of interrupt sources. The set of interrupt requests can be provided by a plurality of interrupt sources In another aspect, the routing circuit of each domain interrupt controller circuit can receive status information from each thread of the plurality of threads in which the selected thread can be based on the enable indicators and the received status information from each thread.

In another aspect, the enable indicators of the programmable storage circuit in each domain interrupt controller circuit can be configured to be dynamically updated during operation of the data processing system.

Because the apparatus implementing the present disclosure is, for the most part, composed of electronic components and circuits known to those skilled in the art, circuit details will not be explained in any greater extent than that considered necessary as illustrated above, for the understanding and appreciation of the underlying concepts of the present disclosure and in order not to obfuscate or distract from the teachings of the present disclosure.

Although the disclosure has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The term "thread," as used herein, is defined as a sequence of software instructions designed for execution on a computer system. A thread, or computer software program or code, may include a subroutine, a function, a procedure, an object method, an object implementation, an executable application, an applet, a servlet, a source code, an object code, a shared library/dynamic load library and/or other sequence of instructions designed for execution on a computer system. The threads or software codes can have code and data portions that are grouped in a resource domain 204 (FIG. 2).

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuit located on a single integrated circuit or within a same device. Alternatively, system 100 may include any number of separate integrated circuits or separate devices interconnected with each other. For example, memory 112 may be located on a same integrated circuit as processor device 106 or on a separate integrated circuit or located within another peripheral or slave discretely separate from other elements of system 100. Interrupt handler 114 and I/O circuit may also be located on separate integrated circuits or devices. Also for example, system 100 or portions thereof may be soft or code representations of physical circuit or of logical representations convertible into physical circuit. As such, system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program or software code and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A multi-threaded processing system configured to execute a plurality of threads, comprising:
    a plurality of domains, each domain assigned one or more threads of the plurality of threads;
    a plurality of software codes, wherein each thread of the plurality of threads corresponds to one of the plurality of software codes;
    a plurality of domain interrupt controller circuits wherein each domain interrupt controller circuit corresponds to a domain of the plurality of domains, each domain interrupt controller circuit comprising:
        an interrupt selection circuit configured to select an interrupt request from a set of interrupt requests received by the interrupt selection circuit and determine an interrupt vector for the selected interrupt request;
        a programmable domain-thread storage circuit configured to store an enable indicator corresponding to each assigned thread of the plurality of threads, wherein the enable indicator for each corresponding thread indicates whether or not the corresponding domain is permitted to route interrupt vectors to the corresponding thread; and
        a routing circuit configured to route the interrupt vector to a selected thread of the plurality of threads which is selected based at least in part on the enable indicators.

2. The multi-threaded processing system of claim 1, wherein the set of interrupt requests is provided by a plurality of interrupt sources.

3. The multi-threaded processing system of claim 2, wherein the data processing system further comprises the plurality of interrupt sources.

4. The multi-threaded processing system of claim 3, wherein, in each domain interrupt controller circuit, the interrupt selection circuit is configured to select an interrupt request based on the priority level of each interrupt source and the enable bit per interrupt source for the corresponding domain.

5. The multi-threaded processing system of claim 2, further comprising priority status storage circuit configured to store a priority level of each interrupt source and configured to store, for each domain of the plurality of domains, an enable bit per interrupt source.

6. The multi-threaded processing system of claim 1, further comprising a plurality of processor cores, in which each processor core is configured to execute one or more threads of the plurality of threads.

7. The multi-threaded processing system of claim 1, further comprising a processor core configured to execute the plurality of threads.

8. The da multi-threaded to processing system of claim 1, wherein the enable indicators of the programmable storage circuit in each domain interrupt controller circuit are configured to be dynamically updated during operation of the data processing system.

9. The multi-threaded processing system of claim 1 wherein the routing circuit of each domain interrupt controller circuit comprises a connection between the corresponding domain and each thread of the plurality of threads.

10. The multi-threaded processing system of claim 1, wherein the routing circuit of each domain interrupt controller circuit receives status information from each thread of the plurality of threads in which the selected thread is based on the enable indicators and the received status information from each thread.

11. In a multi-threaded processing system having a plurality of domains, each domain assigned one or more threads of a plurality of threads, and configured to execute a plurality of threads associated with software codes, a method comprising:
    programming a plurality of domain interrupt controller circuits wherein each domain interrupt controller circuit corresponds to a domain of the plurality of domains, each domain interrupt controller circuit comprising:
        an interrupt selection circuit selecting a first interrupt request from a set of received interrupt request and determining a first interrupt vector for the selected first interrupt request;
        a domain-thread storage circuit with an enable indicator corresponding to each thread of the plurality of threads, wherein the enable indicators of the domain-thread storage circuit of each corresponding domain indicate a set of threads of the plurality of threads to which interrupt vectors are permitted to be routed from the corresponding domain;
        a routing circuit selecting a first thread to receive the selected interrupt request based on the enable indicators corresponding to the domain and routing the first interrupt vector to the selected thread.

12. The method of claim 11, further comprising:
    in each domain of the plurality of domains, selecting a second interrupt request from the set of received interrupt requests;
    determining a second interrupt vector for the selected second interrupt request;
    based on the enable indicator corresponding to the one domain, selecting a second thread to receive the selected second interrupt request; and routing the second interrupt vector to the second selected thread.

13. The method of claim 11, wherein the set of received interrupt requests is received from a plurality of interrupt sources, and selecting the first interrupt request is performed based on a priority level of each interrupt source and an enable bit per interrupt source for each domain of the plurality of domains.

14. The method of claim 11, further comprising:
programming the domain-thread storage circuit corresponding to each domain of the plurality of domains with a different set of enable indicators such that the one domain is permitted to route interrupt vectors to a different set of threads of the plurality of threads.

15. The method of claim 11 wherein the data processing system includes a plurality of cores each configured to execute a set of threads of the plurality of threads.

16. The method of claim 11, further comprising:
receiving status information from each thread of the plurality of threads, wherein the selecting the first thread is selected based on the enable indicator corresponding to each domain of the plurality of domains and the received status information from each thread.

17. A multi-threaded processing system, comprising:
a plurality of processor cores, each processor core configured to execute a set of threads of a plurality of threads associated with software code;
a plurality of domain interrupt controller circuits wherein each domain interrupt controller circuit corresponds to a domain of a plurality of domains, each domain assigned one or more threads of the plurality of threads;
each domain interrupt controller circuit comprising:
an interrupt selection circuit configured to select an interrupt request from a set of interrupt requests received by the interrupt selection circuit and determine an interrupt vector for the selected interrupt request; and
a programmable domain-thread storage circuit configured to store an enable indicator corresponding to each assigned thread of the plurality of threads, wherein the enable indicator for each corresponding thread indicates whether or not the corresponding domain is permitted to route interrupt vectors to the corresponding thread;
a routing circuit configured to route the interrupt vector to a selected thread of the plurality of threads which is selected based at least in part on the enable indicators, wherein the routing circuit includes a connection between the corresponding domain and each thread of the plurality of threads.

18. The multi-threaded processing system of claim 17, further comprising a plurality of interrupt sources, wherein the set of interrupt requests is provided by a plurality of interrupt sources.

19. The multi-threaded processing system of claim 17, wherein the routing circuit of each domain interrupt controller circuit receives status information from each thread of the plurality of thread in which the selected thread is based on the enable indicators and the received status information from each thread.

20. The multi-threaded processing system of claim 18, wherein the enable indicators of the programmable storage circuit in each domain interrupt controller circuit are configured to be dynamically updated during operation of the data processing system.

* * * * *